United States Patent [19]

Gellert

[11] Patent Number: 4,945,630
[45] Date of Patent: Aug. 7, 1990

[54] METHOD OF MAKING A SELECTED SIZE INJECTION MOLDING NOZZLE

[76] Inventor: Jobst U. Gellert, 7A Prince Street, Georgetown, Ontario, Canada, L7G 2X1

[21] Appl. No.: 478,503

[22] Filed: Feb. 12, 1990

[30] Foreign Application Priority Data

Jan. 19, 1990 [CA] Canada ................................. 2008171-6

[51] Int. Cl.⁵ ............................................. H05B 3/00
[52] U.S. Cl. ...................................... 29/611; 29/460; 29/527.2; 219/542; 219/543; 427/103; 427/185; 427/205; 425/549
[58] Field of Search ...................... 29/611, 460, 527.2; 219/542, 543; 427/103, 185, 205; 425/548, 549

[56] References Cited

U.S. PATENT DOCUMENTS 4,768,283  9/1988  Gellert ................................. 29/611
4,773,154  9/1988  Gellert ................................. 29/611
4,865,535  9/1989  Gellert ................................ 425/549

Primary Examiner—P. W. Echols
Attorney, Agent, or Firm—Riches, McKenzie & Herbert

[57] ABSTRACT

A method of making injection molding nozzles of predetermined desired lengths and capacity which combines the advantages of large scale manufacturing with the flexability of individual assembly. Individual steel components such as a rear portion, an elongated forward portion, and a connector member are manufactured in volume, with the forward portion being made in different predetermined sizes. A forward portion having a particular length and melt bore diameter is then selected, and assembled together with a rear portion and a connector member. If necessary, the melt channel through the rear portion and connector member are enlarged to match the bore of the forward portion. The assembled components are then integrally brazed together to form a nozzle having a particular predetermined length and melt channel diameter.

7 Claims, 4 Drawing Sheets

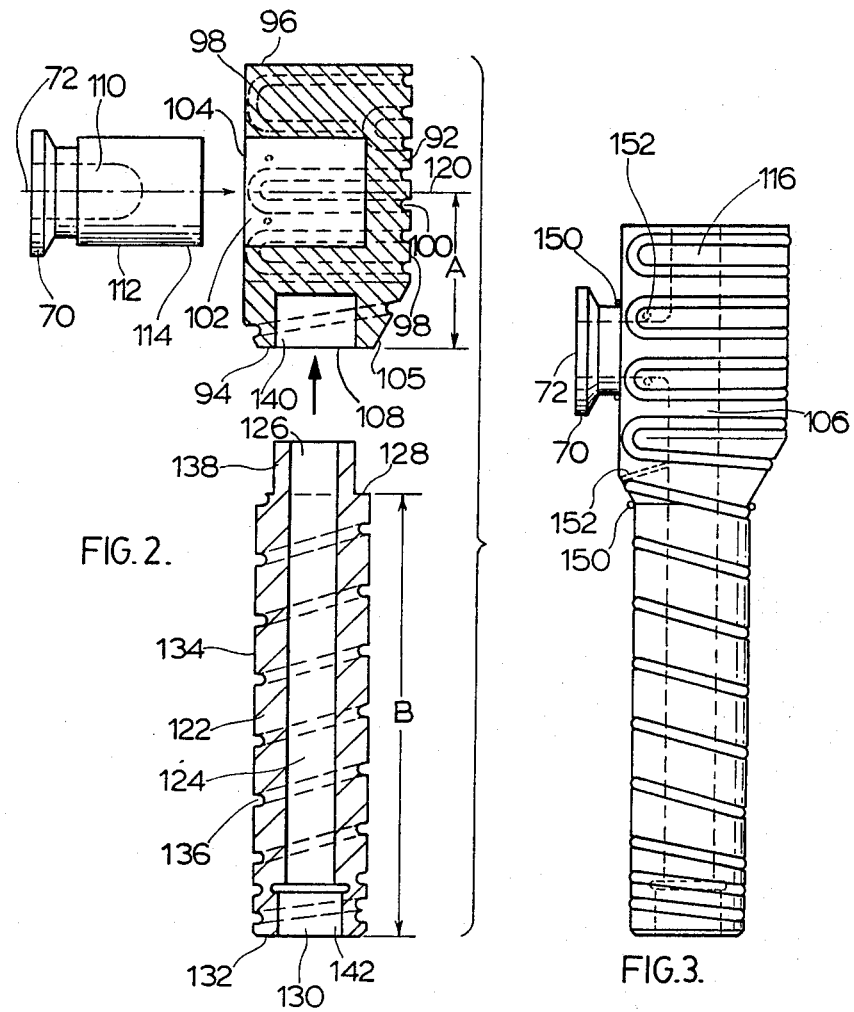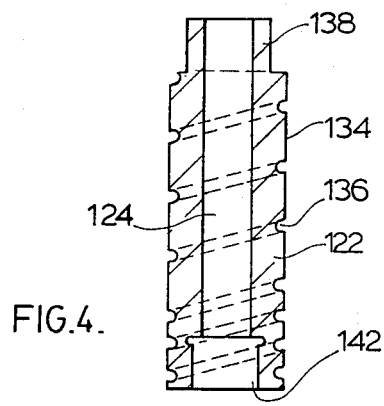

METHOD OF MAKING A SELECTED SIZE INJECTION MOLDING NOZZLE

BACKGROUND OF THE INVENTION

This invention relates generally to injection molding and more particularly to a method of making integral heated nozzles having different lengths and melt channel diameters for different situations.

Of course, methods of making heated injection molding nozzles including integrally brazing in a vacuum furnace are well known in the art. Examples are shown in the applicant's U.S. Pat. No. 4,768,283 which issued Sept. 6, 1988, U.S. Pat. No. 4,773,154 which issued Sept. 27, 1988 and U.S. Pat. No. 4,865,535 which issued Sept. 12, 1989. While it has become increasingly advantageous to have smaller standard sized nozzles, for some applications it is desirable to have nozzles of a longer length or with a larger diameter melt channel. This is particularly true for a system where several nozzles are pivotally mounted along a manifold with different angular orientations to supply melt to a common large cavity having a non-linear shape. The nozzle configuration is much better of the nozzles can easily be made of different lengths.

While different sized nozzles can be made by making different sized components individually, this is very time consuming and costly for volume production. Consequently, it is desirable to have a method of making nozzles which combines the advantages of larger scale manufacture of components with the flexibility of individual assembly of the components to provide nozzles of a predetermined selected length and melt channel diameter.

SUMMARY OF THE INVENTION

Accordingly, it is an object of the present invention to at least partially overcome the disadvantages of the prior art by providing a method of making injection molding nozzles in which the forward portions are manufactured in various predetermined sizes and the components are then individually assembled to make nozzles having a predetermined selected length and melt channel diameter.

To this end, in one of its aspects, the invention provides a method of making a selected sized integral injection molding heated nozzle comprising the steps of making a steel rear portion having a forward end, a rear end, and a generally cylindrical outer surface, the outer surface having a continuous convoluted first groove extending to receive an electrical heating element therein, having selecting at least a first elongated steel forward portion made with a forward end, a rear end, and a generally cylindrical outer surface, the outer surface having a continuous convoluted second groove extending to receive an electrical heating element therein, the first elongated forward portion having a melt bore extending therethrough from an inlet at the rear end to an outlet at the forward end, the selected first forward portion being of a predetermined desired outer diameter and length from the forward end to the rear end, the melt bore inlet of the selected first forward portion being of a predetermined desired diameter, machining the rear portion to provide a melt channel extending therethrough from an inlet to an outlet at the forward end, the melt channel outlet having a diameter equal to the diameter of the melt bore inlet of the first forward portion, rotating the first forward portion relative to the rear portion to a position wherein the second groove is in continuous alignment with the first groove, and joining the rear end of the first forward portion to the forward end of the rear portion in this position, wherein the melt bore inlet of the first forward portion is in alignment with the melt channel outlet of the rear portion, winding an electrically insulated heating element in the first and second grooves which extend continuously from the outer surface of the rear portion to the outer surface of the first forward portion, applying brazing material where the rear end of the first forward portion joins the forward end of the rear portion, and applying a coating of binder and metallic powder to the outer surfaces of the rear portion and the first forward portion, and heating the joined rear portion and first forward portion under a partial vacuum in the presence of an inert gas for a period of time and to a temperature sufficient to melt the brazing material to integrally braze the first forward portion to the rear portion and sufficient to melt the metallic powder and remove the binder to form a protective metallic coating on the outer surfaces of the rear portion and the first forward portion.

Further objects and advantages of the invention will appear from the following description taken together with the accompanying drawings.

BRIEF DESCRIPTION OF THE DRAWINGS

FIG. 2 is a sectional view showing the components of the nozzle in position for assembly, FIG. 3 is a sectional view of the assembled components, FIG. 4 is a sectional view showing a first elongated forward portion of a different length.

DETAILED DESCRIPTION OF THE DRAWINGS

Figure 1:
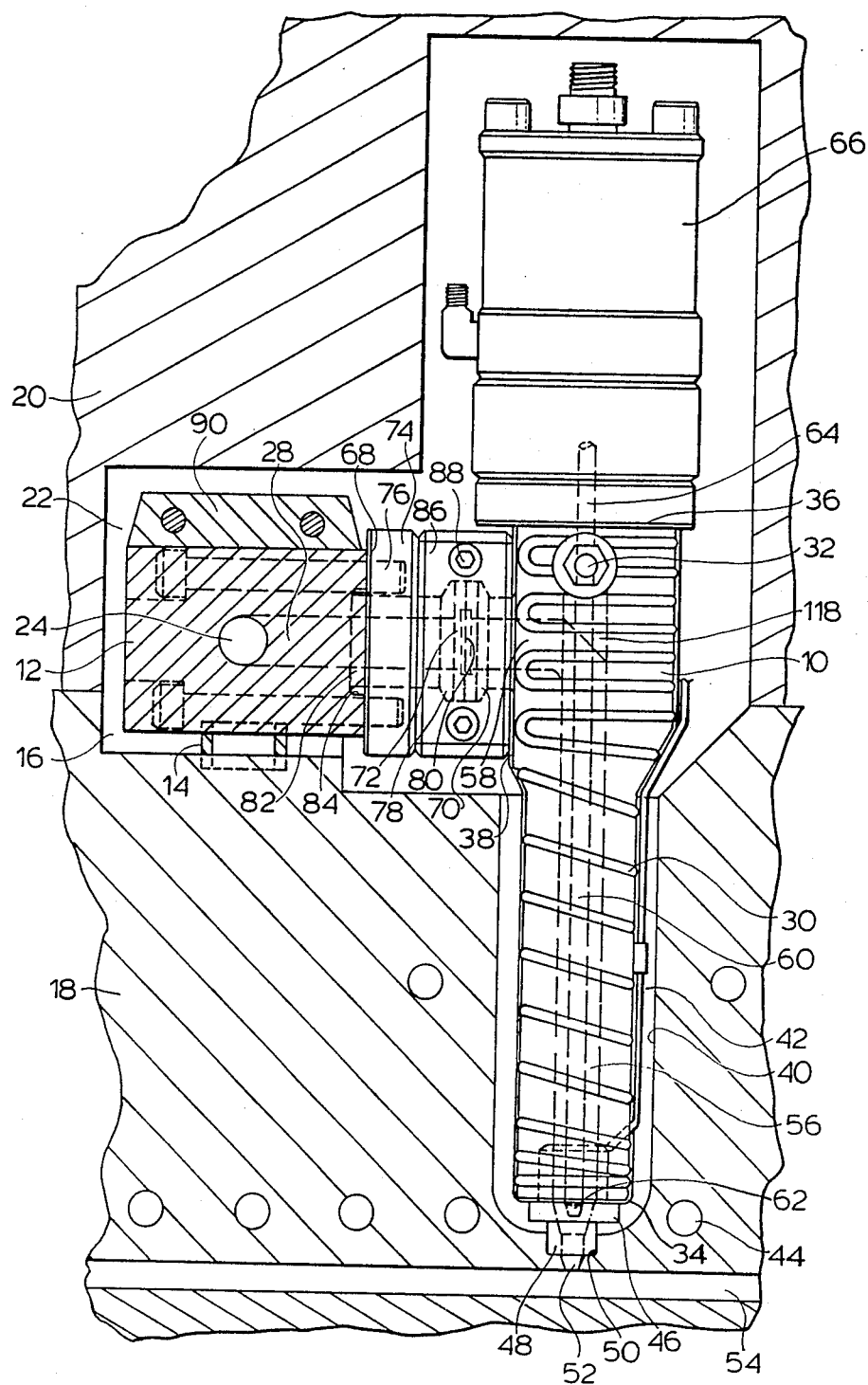
FIG. 1 is a sectional view showing a nozzle made according to a preferred embodiment of the invention mounted on a manifold.

Reference is first made to FIG. 1 which shows a nozzle 10 securely mounted in a desired position on an elongated manifold 12. The manifold 12 is securely positioned by a locating ring 14 in an opening 16 between the cavity plate 18 and the mold back plate 20. The manifold 12 is heated by an electrical heating element (not shown), and the hot manifold 12 is separated from the surrounding cooled cavity plate 18 and mold back plate 20 by an insulative air space 22. The manifold 12 has a central melt bore 24 which extends longitudinally from an inlet (not shown) and branches to a number of lateral outlet bores 28.

The nozzle 10 is heated by an integral electrical heating element 30 extending from a terminal 32. The nozzle 10 has a forward end 34, a rear end 36 and a side surface 38. The forward end 34 of the nozzle 10 extends into a well 40 in the cavity plate 18. An insulative air space 42 is provided between the heated nozzle 10 and the cavity plate 18 which is cooled by pumping cooling water through cooling conduits 44. The forward end 34 of the nozzle 10 has a gate insert 46 extending from it. As described in the applicant's Canadian patent application Ser. No. 578,974 filed Sept. 30, 1988 entitled "Injection Molding Nozzle with Replaceable Gate Insert", the gate insert 46 has a forward portion 48 which is received in a seat 50 which extends around the gate 52 leading to the cavity 54. This securely and accurately locates the forward end 36 of the nozzle 10 centrally in the well 40. The nozzle 10 has a melt channel 56 which extends through the gate insert 46 in alignment with the gate 52 in this position. The gate insert 46 need not be provided and various other gating configurations can be used. In fact, while a valve gated nozzle is shown in this example, the method according to the invention can also be used to make a sprue gated nozzle. As described in more detail below, the melt channel 56 has a lateral portion 58 which extends in alignment with one of the lateral outlet bores 28 in the manifold 12.

An elongated valve member 60 is received centrally in the melt channel 56 of each nozzle 10. The elongated valve pin 60 has a forward end 62 which seats in the gate 52 in the forward closed position, and a portion 64 which extends rearwardly from the rear end 36 of the nozzle 10 and is engaged by the actuating mechanism 66 which may be pneumatic or hydraulic which is mounted on the rear end 36 of the nozzle 10 as described in the applicant's Canadian patent application Ser. No. 592,346 filed Feb. 28, 1989 entitled "Injection Molding with Self-Supporting Actuating Mechanism". When actuating pressure is applied to the actuating mechanism 66, the valve member 60 is reciprocated between the retracted open position shown, and the forward closed position in which the forward end 62 of the valve member 60 is seated in the gate 52.

As described in the applicant's Canadian patent application Ser. No. 2088170-8 filed Jan. 19, 1990 entitled "Injection Molding Manifold and Nozzle having Laterally Clamped Flanges" each nozzle 10 and its attached actuating mechanism 66 is mounted with a desired angular orientation along the side surface 68 of the manifold 12. The nozzle 10 has a tapered flange portion 70 which projects outward from the side surface 38. The lateral portion 58 of the melt channel 56 extends through this flange portion 70 from an inlet 72. A connector collar 74 is secured by bolts 76 to the side surface 68 of the manifold 12 around each lateral outlet bore 28 from the longitudinal melt bore 24. As can be seen, each connector collar 74 has an outwardly projecting matching flange portion 78 through which the outlet bore 28 extends to an outlet 80. Each connector collar 74 also has a neck portion 82 which projects inwardly into a recessed seat 84 in the side surface 68 of the manifold to accurately locate the connector collar 74 in alignment with the outlet bore 28.

The flange portion 70 of each nozzle is secured to the flange portion 78 of one of the connector collars 74 by a wedge clamp 86. The wedge clamp 86 has two matching halves with tapered inner surfaces which are tightened together by bolts 88 over the tapered flange portions 70,78 to hold them securely together with the outlet 80 aligned with the inlet 72. This has the advantage that each of the nozzles 10 can be positioned in any desired angular orientation before the bolts 88 are tightened and it will be retained in that position. This also greatly facilitates realignment, if necessary.

In use, the system is assembled as shown. Electrical power is applied to the heating elements 30 and to the plate heater 90 to heat the manifold 12 and nozzles 10 to a predetermined operating temperature. Pressurized melt form a molding machine (not shown) is then injected into the manifold melt bore 24 according to a predetermined operating cycle. The pressurized melt flows out each of the outlet bores 28 and into each of the nozzles 10 through the aligned lateral portions 58 of the melt channel 56. It flows around the valve member 60, through the larger diameter melt channel 56, through the aligned gate insert 46 and gate 52, and into the cavity 54. Pneumatic pressure is also applied to the actuating mechanism 66 according to the cycle to position the valve member 60 in the retracted open position when the injection melt pressure is applied. After the cavities 54 are full, injection pressure is held momentarily to pack and pneumatic pressure is then applied to each actuating mechanisms 66 to drive the valve members 60 to the forward close position in which the forward end 62 of each valve member 60 is seated in a respective gate 52. Injection pressure is then released and after a short cooling period, the mold is opened along the parting line to eject the molded product. After ejection, the mold is closed and pneumatic pressure is reapplied to the actuating mechanism 66 to withdraw the valve members 60 to the open position and injection pressure is reapplied to refill the cavities 54. This cycle is repeated continuously with a frequency dependent upon the size of cavity and type of material being molded.

References is now made to FIGS. 2-8 to describe the method of making nozzles according to preferred embodiments of the invention. As mentioned above, this method combines the advantages of large scale manufacture of components with the flexibility of individual assembly of the components to provide nozzles having a predetermined selected length and melt channel diameter. Initially, a number of components, as seen in FIGS. 2-5 and described below are made of suitable steel. In FIG. 2, a rear portion 92 has a forward end 94, a rear end 96 and a generally cylindrical outer surface 98. The outer surface 98 has a continuous convoluted first groove 100, and a cylindrical opening 102 extends radially to a side surface 104. The rear portion 92 has a shoulder 105 which tapers gradually inward from the outer surface 98 to the forward end 94. In this embodiment, as seen in FIG. 3, a connector member 112 is made with a cylindrical portion 114 which is received in the cylindrical opening 102. The connector member 112 has an outwardly projecting flange portion 70. The rear portions 92 are manufactured in volume with a predetermined length A from the centerline 120 of the bore 110 to the forward end 94 and a melt channel diameter.

Figure 5:
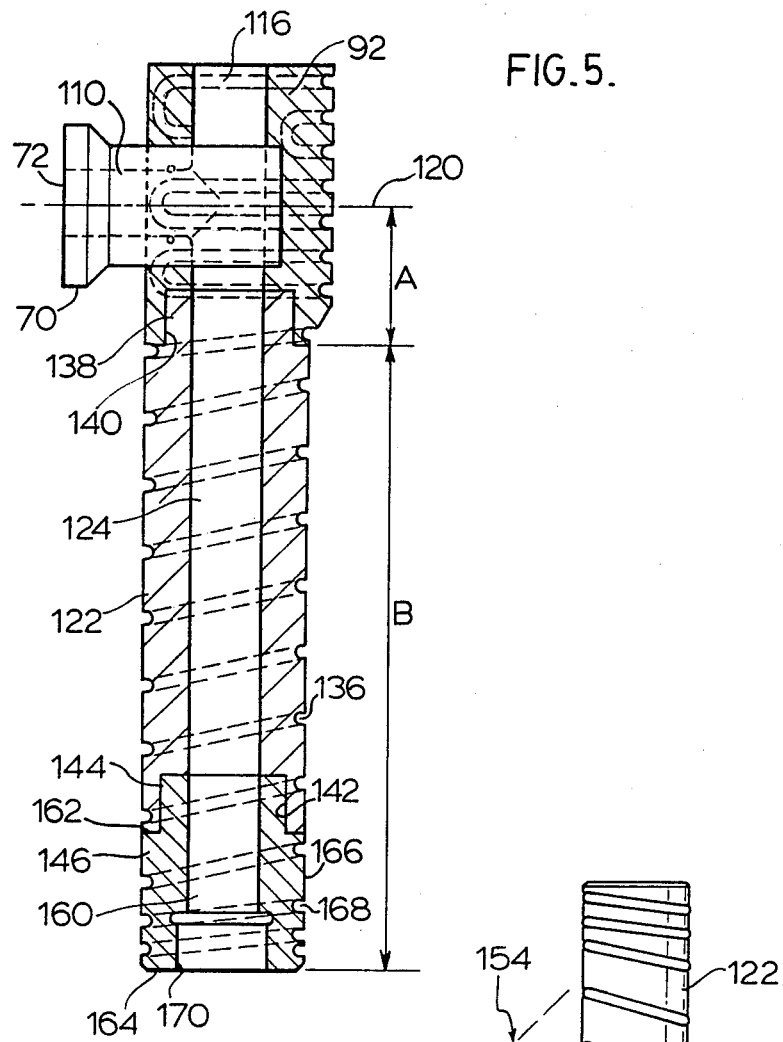
FIG. 5 is a sectional view showing a nozzle having two forward portions and a larger diameter melt channel.

Also shown in FIG. 2 is a first elongated forward portion 122 having a central melt bore 124 extending therethrough from an inlet 126 at the rear end 128 to an outlet 130 at the forward end 132. The first forward portion 122 has a cylindrical outer surface 134 of a predetermined diameter with a second continuous convoluted groove 136 extending therein. The first forward portion 122 has a neck portion 138 which projects at the rear end 128 and matches a recessed seat 140 at the forward end 94 of the rear portion 92. The first forward portion 122 also has a recessed seat 142 at the forward end 132 to receive a gate insert (not shown) or the neck portion 144 of a second elongated forward portion 146, as shown in FIG. 5. The first forward portion 122 is manufactured in volume with a number of different predetermined lengths B and melt bore diameters. A forward portion 122 having a shorter length is illustrated in FIG. 4.

After a quantity of components have been made, a nozzle having a particular selected length and melt channel diameter is made as follows. A forward portion 122 having a predetermined length and a predetermined melt bore diameter is selected. The cylindrical portion 114 of a connector member 112 is inserted into the radial cylindrical opening 102 in a rear portion 102 and they are tack welded together. The rear portion 92 and connector member 112 are then machined to provide a melt channel 106 having a diameter equal to the diameter of the melt bore 124 through the forward portion 122, and to provide a bore 116 extending from the rear end 96 to the melt channel 106. The lateral portion 58 of the melt channel 106 is provided by the bore 110 which was previously machined into the connector member 112, In this embodiment, the melt channel 106 extends from an inlet 72 at the flange portion 70 around a 90° bend to an outlet 108 at the forward end 94 of the rear portion 92. As seen in FIG. 1, in the completed nozzle 10, the bore 116 receives a valve bushing portion 118 of the actuating mechanism 66 with the valve member 60 extending therethrough. In a sprue gated nozzle made according to an alternate embodiment of the invention, the rear portion 92 and the connector member 112 are machined to only provide the melt channel 106 extending from an inlet at the rear end 96 to the outlet 108 at the forward end 94 of the rear portion 92.

Alternatively, the rear portion 92 and the connector member 112 can be made initially with a melt channel 106 of a minimum diameter, and then enlarged later to match the diameter of the melt bore 124 through the forward portion 122. Drilling the rear portions 92 and the connector members 112 to either form or enlarge the melt channel 106 can be done either before or after assembly of the components.

If the outside diameter of the forward portion 122 is greater than the diameter of the forward end 94 of the rear portion 92, the outer diameter of the forward end 94 of the rear portion 92 can be increased to match by machining off a calculated amount of the forward end 94. This will, of course, reduce the length of the nozzle by the amount machined off. The neck portion 138 at the rear end 128 of the forward portion 122 is inserted into the seat 140 at the forward end 94 of the rear portion 92. The forward portion 122 is rotated relative to the rear portion 92 until the second groove 136 is in continuous alignment with the first groove 100, and they are then tack welded together to hold them in place.

Figure 6:
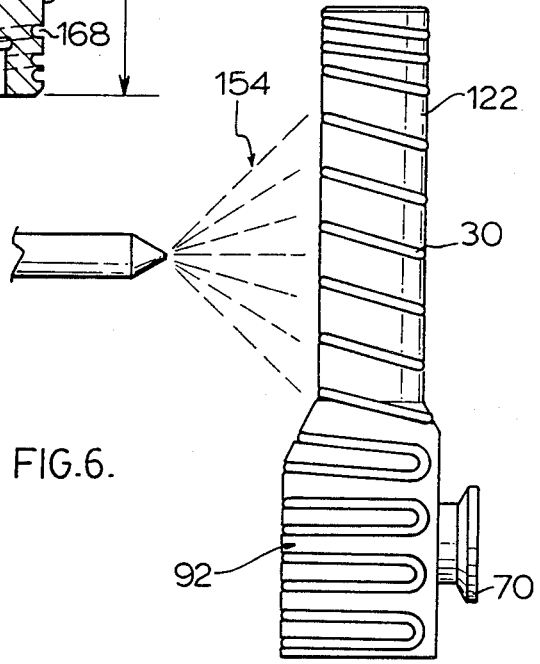
FIG. 6 is a schematic view showing the assembled components being sprayed with lacquer.
Figure 7:
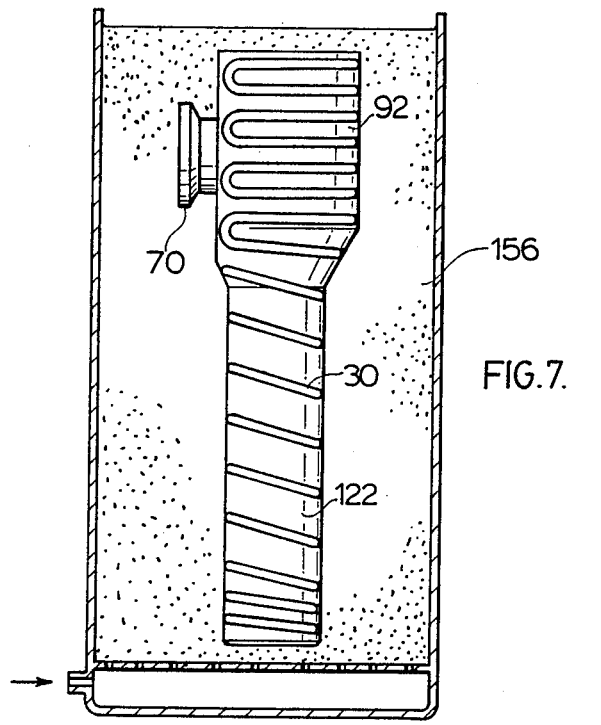
FIG. 7 is a schematic view showing the assembled components being dipped in nickel powder.
Figure 8:
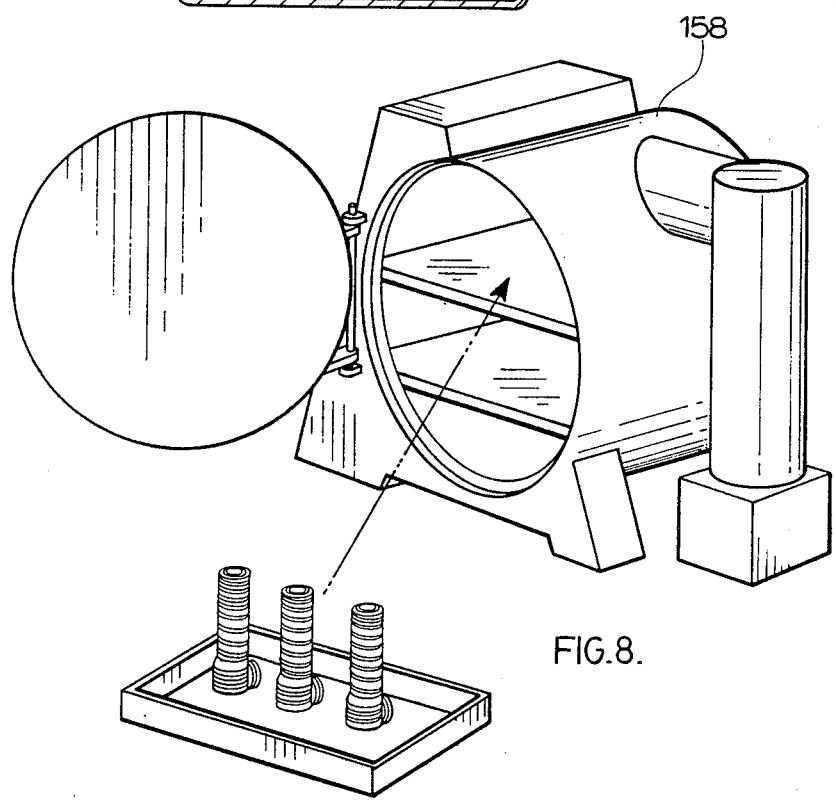
FIG. 8 shows a batch of assembled nozzles ready to be inserted into a vacuum furnace.

The heating element 30 is then wound in the aligned first and second grooves 100,136 and extended to the terminal 32. In a preferred embodiment, the heating element 30 has a nickel-chrome resistance wire extending centrally through a refractory powder electrical insulating material such as magnesium oxide inside a steel casing. Beads 150 of nickel brazing paste are applied along where the connector member 112 and the forward portion 122 join the rear portion 92. Small holes 152 can be drilled through the rear portion 92 to receive brazing paste to ensure it provides a good join. As seen in FIGS. 6 and 7, the assembled components are then sprayed with a binder such as acrylic lacquer 154 and immersed in a bath of nickel alloy powder 156. Some of the powder sticks to the lacquer to cast the surfaces (including the melt channel 56) of the assembly. The powder 156 is agitated by aeration from below to provide a fluidized bath to ensure the assembly is completely coated.

The assembly is then oriented with the forward end 34 up and inserted (usually in batches) in a vacuum furnace 158. The furnace 158 is gradually heated to a temperature in excess of the melting point of the brazing material. At the same time the furnace is evacuated to a relatively high vacuum to remove substantially all the oxygen, but before the melting point of the nickel alloy is reached, the vacuum is reduced by partially back filling with an inert gas such as argon or nitrogen. As the coating is heated, the binder is volatized, but the nickel alloy stays in place. When the nickel alloy and brazing material melts, it flows by capilliary action around the surfaces of the heating element 30 to fill the grooves 100,136 and integrally embed the heating element 30. The molten nickel alloy also flows around the neck portion 144 of the forward portion 122 and the cylindrical portion 114 of the connector member 112 to integrally join them to the rear portion 92.

The nickel alloy powder on the surfaces of the assembly provides a complete protective coating of nickel alloy having a substantially uniform thickness, including the surfaces of the melt channel 56. Brazing the assembly in a vacuum provides a metallurgical bonding of the nickel alloy to the steel which improves the efficiency of the heat transfer from the heating element 30 as well as the adherence of the protective coating. Thus an integral structure is provided which sufficiently transfers heat from the heating element and distributes it along the melt bore. As can be seen, the pitch or heat profile of the heating element 30 varies along its length to provide less heat in the middle of the nozzle where there is less heat loss. This profile can be controlled for any particular application by varying the pattern of the groove 100,136.

Reference is now made to FIG. 5 which illustrates an assembly according to another embodiment of the invention. In this case, a second forward portion 146 is also selected having a central melt bore 160 extending therethrough from a rear end 162 to a forward end 164. As can be seen, the melt bore 160 is the same diameter as the melt bore 124 through the first forward portion 122. However, in this embodiment, this diameter is somewhat greater than the melt bore diameter in the embodiment described above. The second forward portion 146 has a neck portion 144 at the rear end 162 which is received in a seat 142 at the forward end 132 of the first forward portion 122, with the melt bores 124,160 in alignment. The second forward portion also has a cylindrical outer surface 166 with a third continuous convoluted groove 168 which is aligned with the second groove 136 in the first forward portion 122. A recessed seat 170 is also formed at the forward end 132 to receive a gate insert (not shown) or another forward portion. The steps of winding the heating element, applying the coating, and integrally brazing are all identical to those described above, except the second forward portion 146 is included as well as the first forward portion 122. Thus, it will be appreciated that nozzles having an even longer length B can be made by selecting two or more forward portions of predetermined selected lengths and mounting them together in alignment with the rear portion 92.

While the description of the method of making nozzles has been given with respect to preferred embodiments of the invention, it is not to be construed in a limiting sense. Variations and modifications will occur to those skilled in the art. For instance, as mentioned, the configuration of the nozzle can be made different for a sprue gating application. However, the method has the same advantage of quickly and economically forming injection molding nozzles of different lengths and capacities. Reference is made to the appended claims for a definition of the invention.

What I claim is:

1. A method of making a selected sized integral injection molding heated nozzle comprising the steps of:
    (a) making a steel rear portion having a forward end, a rear end, and a generally cylindrical outer surface, the outer surface having a continuous convoluted first groove extending to receive an electrical heating element therein, having,
    (b) selecting at least a first elongated steel forward portion made with a forward end, a rear end, and a generally cylindrical outer surface, the outer surface having a continuous convoluted second groove extending to receive an electrical heating element therein, the first elongated forward portion having a melt bore extending therethrough from an inlet at the rear end to an outlet at the forward end, the selected first forward portion being of a predetermined desired outer diameter and length from the forward end to the rear end, the melt bore inlet of the selected first forward portion being of a predetermined desired diameter,
    (c) machining the rear portion to provide a melt channel extending therethrough from an inlet to an outlet at the forward end, the melt channel outlet having a diameter equal to the diameter of the melt bore inlet of the first forward portion,
    (d) rotating the first forward portion relative to the rear portion to a position wherein the second groove is in continuous alignment with the first groove, and joining the rear end of the first forward portion to the forward end of the rear portion in this position, wherein the melt bore inlet of the first forward portion is in alignment with the melt channel outlet of the rear portion,
    (e) winding an electrically insulated heating element in the first and second grooves which extend continuously from the outer surface of the rear portion to the outer surface of the first forward portion,
    (f) applying brazing material where the rear end of the first forward portion joins the forward end of the rear portion, and applying a coating of binder and metallic powder to the outer surfaces of the rear portion and the first forward portion, and
    (g) heating the joined rear portion and first forward portion under a partial vacuum in the presence of an inert gas for a period of time and to a temperature sufficient to melt the brazing material to integrally braze the first forward portion to the rear portion and sufficient to melt the metallic powder and remove the binder to form a protective metallic coating on the outer surfaces of the rear portion and the first forward portion.

2. A method as claimed in claim 1 wherein the diameter of the melt channel outlet of the rear portion is made to match the diameter of the melt bore inlet of the first forward portion.

3. A method as claimed in claim 2 wherein the forward end of the rear portion is made with a predetermined outer diameter and the rear portion is made with a shoulder which tapers gradually inward from the outer surface to the forward end, whereby the outer diameter of the forward end of the rear portion can be increased to match the outer diameter of the first forward portion by machining off a calculated amount of the forward end of the rear portion.

4. A method as claimed in claim 3 further including:
    selecting a second elongated steel forward portion made with a forward end, a rear end, and a generally cylindrical outer surface, the outer surface having a continuous convoluted third groove extending to receive an electrical heating element therein, the second elongated forward portion having a melt bore extending therethrough from an inlet at the rear end to an outlet at the forward end, the selected second forward portion being of a predetermined desired length from the forward end to the rear end, the melt bore inlet of the selected second forward portion being of a diameter equal to the diameter of the melt bore outlet of the first forward portion,
    rotating the second forward portion relative to the first forward portion to a position wherein the third groove is in continuous alignment with the second groove, and joining the rear end of the second forward portion to the forward end of the first forward portion in this position, wherein the melt bore inlet of the second forward portion is in alignment with the melt bore outlet of the first forward portion, and
    including the second forward portion as well as the first forward portion and the rear portion in steps (d), (e) and (f).

5. A method as claimed in claim 3 wherein the selected rear portion is made with a recessed seat surrounding the melt channel outlet at the forward end, and the selected first forward portion has a matching neck portion projecting at the rear end, wherein step (c) includes inserting the neck portion of the first forward portion into the recessed seat of the rear portion and tack welding them together.

6. A method as claimed in claim 3 wherein the selected rear portion is made with a cylindrical opening extending radially to a side surface, further including:
    making a steel connector member having a cylindrical portion with a tapered flange portion extending therefrom, the connector member having a bore extending therethrough,
    mounting the cylindrical portion of the connector member in the radial opening in the rear portion, wherein the bore in the connector member forms a portion of the melt channel extending from the inlet at the flanged portion to the outlet at the forward end, and
    including the connector member in steps (d) and (e) to become an integral part of the injection nozzle.

7. A method as claimed in claim 6 wherein the rear portion and the connector member are made with a bore extending from the melt channel to the rear end of the rear portion, the bore being in alignment with the melt channel outlet at the forward end to receive a valve member therethrough.

* * * * *